United States Patent Office 3,503,937
Patented Mar. 31, 1970

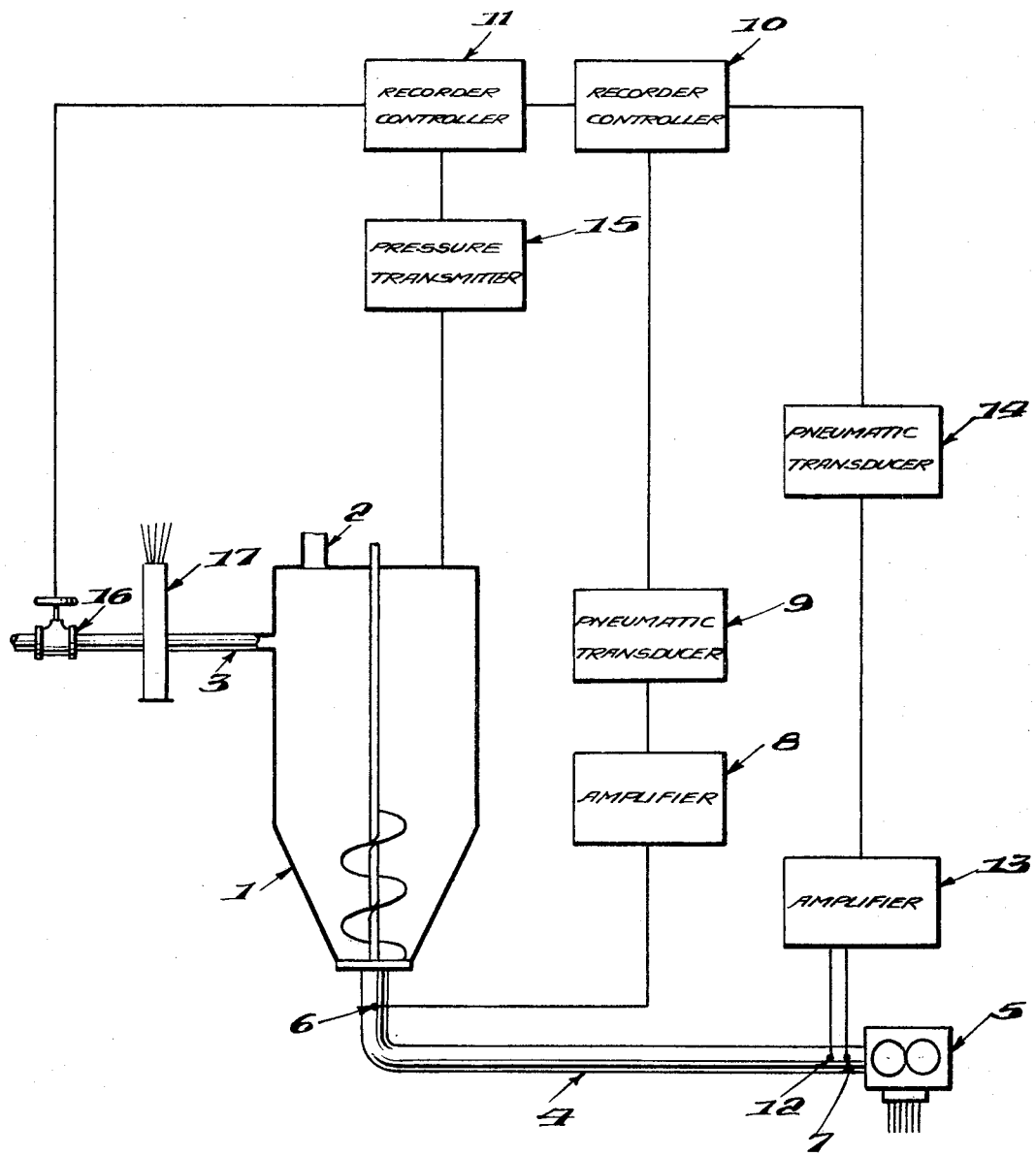

3,503,937
VISCOSITY CONTROL FOR CONTINUOUS PREPARATION OF POLYMER
Eugene S. Allen, Richmond, Va., and Benjamin F. Coe, Wilmington, Del., assignors to E. I. du Pont de Nemours and Company, Wilmington, Del., a corporation of Delaware
Filed Aug. 11, 1966, Ser. No. 571,743
Int. Cl. C08g 20/20
U.S. Cl. 260—78                           1 Claim

ABSTRACT OF THE DISCLOSURE

A process for the preparation of condensation polymers wherein the viscosity is controlled by regulating pressure in a vessel through which the molten polymer is moved and the means for controlling the pressure in the vessel is actuated by a signal generated by a first viscosity probe which has a signal actuated adjustable set point. The improvement includes the steps of continuously detecting viscosity downstream of the first probe by means of a second probe spaced from the first probe and generating a second signal proportional to variations in downstream viscosity from a fixed set point, adjusting the magnitude of the second signal when the polymer temperature in the region of the second probe varies from a preselected value and feeding the second signal to the first probe to vary its set point.

---

This invention relates to the preparation of synthetic high molecular weight condensation polymers and more particularly to an improved method for continuous preparation of such polymers.

In the preparation of synthetic condensation polymers such as polyamides and polyesters, the polymer is formed by interaction of the monomer units to form the polymer and a volatile by-product such as water or methanol. Such polymers may be prepared batch-wise by heating the monomer in a pressure vessel at high temperature and pressure followed by venting the vessel to permit escape of the volatile by-product and with further heating as necessary to achieve the desired molecular weight. The polymer is usually extruded to form pellets or flake which may be subsequently melted and extruded or molded to prepare a shaped article. In the batch process, uniformity of molecular weight may be achieved by appropriate control of the polymerization conditions and by blending several batches of the flake or pellets prior to use.

Although the batch process has been widely used, it is now frequently desirable for economic reasons to produce these polymers continuously by passage through appropriate containers where the temperature and pressure are regulated to achieve the desired molecular weight in the polymer as extruded in the form of filaments, films, or other shaped articles. Such continuous processes are described by Hechkert in U.S. 2,689,839 and Taylor in U.S. 2,361,717.

In continuous processes such as disclosed in U.S. Patent No. 3,357,955 where high molecular weight is desired, it is frequently desirable as the final stage in the removal of volatile by-product to pass the polymer through a vessel where the polymer is heated under a partial vacuum or the vessel is continuously swept with a dry inert gas to remove the condensation by-product, the polymer then being passed through a suitable container such as a length of pipe where it is permitted to further polymerize until equilibrium conditions are established prior to extrusion. While continuous processes of this type are economically desirable, it is difficult to prevent undesirable variations in molecular weight over a period of time since the blending procedure used in batch processing is not possible with a continuous process. Improvements in this respect are therefore highly desirable. A similar problem is encountered where polymer flake or pellets are first prepared and then melted under conditions where additional polymerization and removal of condensation by-product take place and the polymer is then passed through an equilibration zone.

It is an object of this invention to provide an improved process for the preparation of synthetic condensation polymers. A further object is to provide a process for preparation of synthetic condensation polymers of improved uniformity with respect to molecular weight. Other objects will become apparent from the description to follow.

It has now been found that improved uniformity of molecular weight can be achieved in the preparation of a condensation polymer where a volatile by-product is removed to facilitate polymerization and where, as a final stage in the process of removing the volatile by-product, the molten polymer passes through a by-product separation vessel and then through an equilibration container where no additional by-product is removed; by the improvement comprising continuously measuring the viscosity of the polymer by means of a first viscometer at a position near the discharge port of the separation vessel, continuously measuring the viscosity of the polymer near the extrusion point by means of a second viscometer, feeding a signal generated by the first viscometer to a controller for automatically regulating the pressure in the polymer separation vessel whereby the viscosity at the discharge of the vessel is maintained substantially at a predetermined set-point, the predetermined set-point being varied automatically in response to a signal from the second viscometer whereby the deviation in viscosity measured by the second viscometer from the set-point established for that viscometer is compensated by the variation in the set-point of the first viscometer.

It will be appreciated that the viscosity of the molten polymer is related to the molecular weight and consequently the molecular weight of the polymer may be regulated by regulating the viscosity.

Any viscometer which is capable of making substantially continuous measurements of polymer viscosity in a reliable manner may be employed. A suitable type of viscometer for this purpose is described by F. F. White, Jr. in U.S. 2,819,610. In this arrangement, a probe which is inserted into the polymer is vibrated at frequent intervals and the rate of attenuation of the vibration determined as a measure of viscosity.

The essential features of the process of this invention are illustrated in the accompanying drawing which is not to scale and in which: FIG. 1 is a schematic illustration of the entire apparatus. Low molecular weight polymer is fed into by-product separator 1 through inlet 2. In the separator, which is maintained at sub-atmospheric pressure, volatile by-product is separated from the polymer and discharged through line 3. The polymer then passes through line 4, the viscosity increasing in the line until equilibrium conditions are attained. The polymer then passes to spinning unit 5 where it is extruded to form multifilament yarn which is then processed in the conventional manner.

A first viscometer probe 6 of the type described by White is placed in pipeline 4 near the outlet of separator 1 and a second probe 7 is located downstream from probe 6 in pipeline 4 near the spinning unit 5. The electronic signal generated by probe 6, i.e., a first signal passes to amplifier 8 and then to pneumatic transducer 9 where the amplified electronic signal is converted to a pneumatic signal which is proportional to the viscosity of the polymer flowing into pipeline 4. The pressure from pneumatic transducer 9 is transmitted to a conventional dual pen pneumatic recorder-controller 10 which records the viscosity of the polymer discharging into pipeline 4. Recorder-controller 10, in addition to recording the viscosity measured by probe 6, acts in conjunction with recorder-controller 11 and other auxiliary equipment to control the pressure in separator 1 and hence the viscosity of the polymer discharged into pipeline 4.

Although the temperature of the polymer is usually regulated closely, some variations in temperature in the equilibration zone will occur. Such temperature variations will not appreciably affect the final molecular weight of the polymer but will affect the melt viscosity at probe 7. These variations must be compensated to achieve satisfactory control of polymer molecular weight. This may be conveniently done by placing a temperature sensing device 12, such as a Foxboro Dynatherm resistance bulb near probe 7. This resistance bulb is used to modify the output of amplifier 13 if variations in temperature from a pre-selected value occur. Other devices and arrangements for temperature detection and compensation, as are well known to those skilled in the art, may be used if desired. Also, it may be desirable to compensate temperature changes at probe 6 in a similar fashion although it has been found that for practical purposes this is not always necessary.

At the beginning of a production run, the absolute pressure level for separator 1 is set manually at the desired level and then adjusted manually, if necessary, until the desired viscosity level, as determined by laboratory measurement, is established at probe 6. When this has been accomplished, the set-point signal from probe 6, i.e., the first signal is adjusted to maintain this viscosity level until the set-point is changed automatically in response to a signal from probe 7, i.e., a second signal. The system is then put on automatic control.

The signal from probe 7 is transmitted to amplifier 13 and then to pneumatic transducer 14 where the electronic signal is converted to a pneumatic signal which is passed to recorder-controller 10 which records the viscosity of probe 7. When the viscosity at probe 7 varies from the desired level which is set manually at controller 10, the set-point for the viscosity at probe 6 is automatically raised or lowered until the correct viscosity level at probe 7 is established. The rate of change in the set-point for probe 6 in response to a viscosity deviation at probe 7 may be adjusted to suit the processing conditions and apparatus employed but, as a general rule, the rate of change should be low to avoid over-compensation.

The pressure in separator 1 is regulated by means of a pressure signal, proportional to the set-point for probe 6, transmitted to recorder-controller 11 from recorder-controller 10. By means of pressure transmitter 15, the pressure in separator 1 is transmitted to recorder-controller 11 where it is compared with the set-point pressure signal. Any imbalance between the two signals results in a change in pressure level in the steam separator. This is accomplished by automatically varying the amount of steam fed by valve 16 to steam jet 17. Steam jet 17, which acts to reduce the pressure in separator 1, is fed by 300 p.s.i.g. (20 atmospheres) steam. The efficiency of this jet is reduced as necessary by feeding steam from valve 16 transversely to the vent stream of steam jet 17. This is a well-known technique for controlling pressure in vacuum vessels.

Preferably, upper and lower limit relays will be installed between recorder-controller 10 and recorder-controller 11 to prevent the pressure signal transmitted to recorder-controller 10 exceeding fixed upper and lower limits. This prevents serious deviation of the polymer viscosity from the desired level in the event of an instrument failure prior to this point. The recorders, controllers and other instruments used in the process of this invention to regulate the polymer viscosity are conventional instruments which are commercially available and are readily selected and installed by those skilled in the art.

EXAMPLE

Polyhexamethylene adipamide is prepared in a continuous process following the general procedure of copending application Ser. No. 345,042, filed Feb. 14, 1964 in the name of James C. Bryan, now U.S. Patent 3,357,955. In accordance with this process, low molecular weight polymer is fed to a steam separator which is maintained at a pressure in the range of 30 mm. Hg to 200 mm. Hg absolute, the pressure being regulated by two viscometers and auxiliary equipment as previously described. After passage through the pipeline where the molecular weight increases to the equilibrium level, the polymer is extruded to form multifilament yarn in the conventional manner. In continuous operation over a period of about five months, it is found that the relative viscosity of the polymer is within 0.25 relative viscosity units of the desired level, 95% of the time. By comparison, when a single viscometer located at the outlet of the separator or at a position near the extrusion point is employed over a period of several months, the relative viscosity of the polymer is within 0.5 viscosity units of the desired level, 95% of the time. By way of further comparison, when the polymer viscosity is regulated by periodic laboratory measurements for a period of about one year, the measured viscosity varies as much as two viscosity units from the desired level.

The process of this invention produces polymer of improved molecular weight uniformity. This uniformity is highly important for the production of uniform textile and industrial yarns and for other shaped articles.

This process is particularly suitable for the production of polyamides, such as polyhexamethylene adipamide, polyhexamethylene sebacamide, polyhexamethylene isophthalamide, polycaprolactam, and polymers from bis-(4-aminocyclohexyl) methane and dibasic acids containing 6–16 carbon atoms. It is also useful for the production of polyesters, such as polyethylene terephthalate.

We claim:

1. In a process for regulating viscosity of a synthetic polycarbonamide polymer being prepared at polymerization temperatures and pressures while being moved successively through a pressure vessel having an inlet, an outlet and means for controlling pressure in the vessel between 30 and 200 mm. Hg absolute, and a holdup chamber connected to the outlet of the vessel to provide a filament forming polymer of uniform viscosity that includes the steps of continuously detecting the viscosity of the polymer at said outlet by means of a first viscosity probe having a signal actuated adjustable set point, generating a first signal proportional to the variation in outlet viscosity from the set point of the first probe and feeding said first signal to the vessel pressure control means for actuation thereof, the improvement comprising the steps of: continuously detecting viscosity in said chamber downstream of said first viscosity probe by means of a second viscosity probe having a set point, said second probe being spaced from said first probe; generating a second signal proportional to the variation in downstream viscosity from the set point of said second probe; feeding said second signal to said first probe to vary the set point viscosity of said first probe, and adjusting the magnitude of said second signal according to uncontrolled variations in polymer temperature in the region of the second probe.

References Cited

UNITED STATES PATENTS 3,357,955   12/1967   Bryan _____ 260—78

HAROLD D. ANDERSON, Primary Examiner

U.S. Cl. X.R.

260—75, 78, 95